No. 831,127. PATENTED SEPT. 18, 1906.
F. C. WILLIAMS.
GRIPPING IMPLEMENT.
APPLICATION FILED JULY 24, 1905.
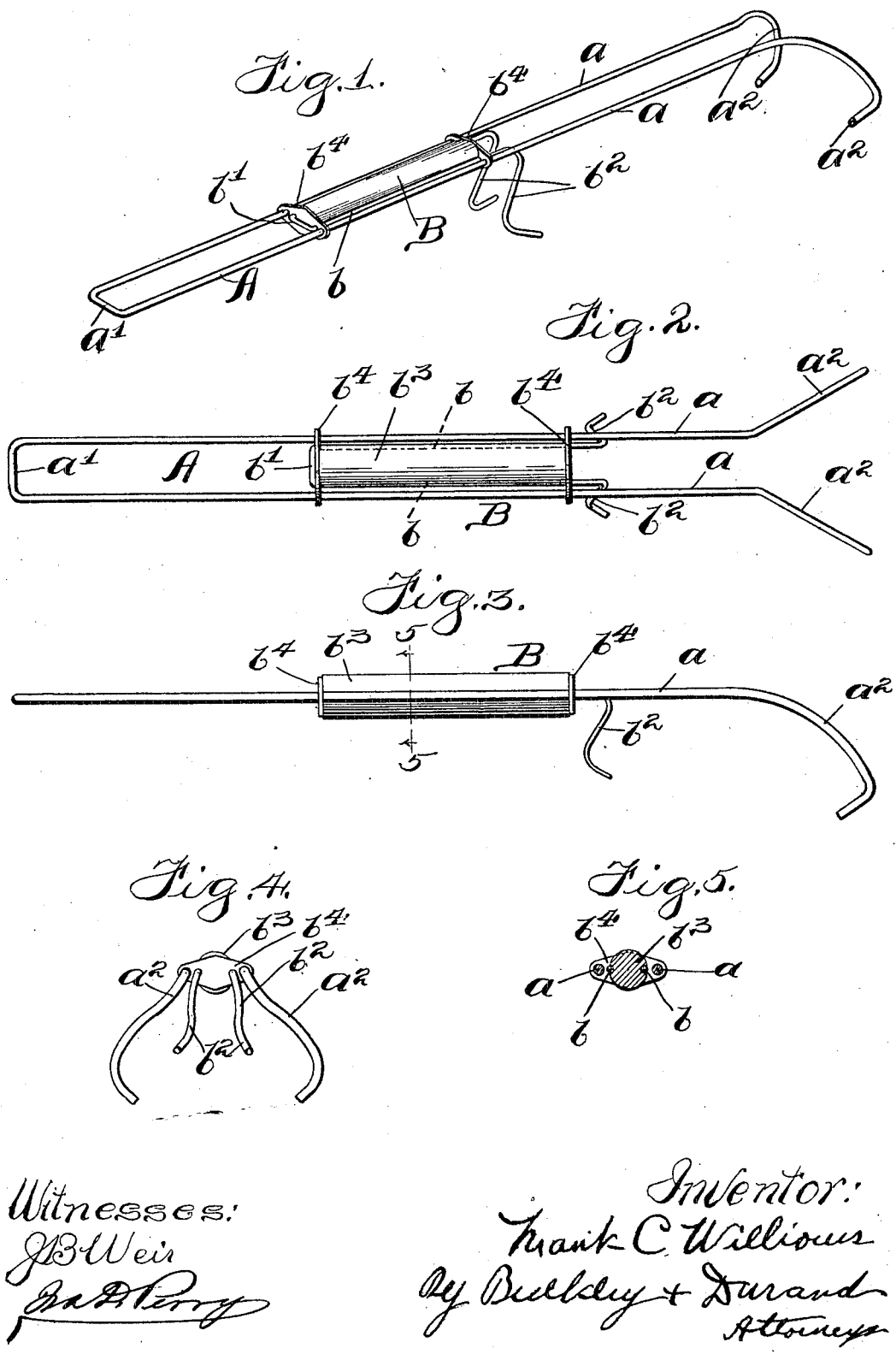

UNITED STATES PATENT OFFICE.

FRANK C. WILLIAMS, OF CHICAGO, ILLINOIS.

GRIPPING IMPLEMENT.

No. 831,127.  Specification of Letters Patent.  Patented Sept. 18, 1906.

Application filed July 24, 1905. Serial No. 270,927.

*To all whom it may concern:*

Be it known that I, FRANK C. WILLIAMS, a citizen of the United States of America, and a resident of Chicago, Illinois, have invented a certain new and useful Improvement in Gripping Implements, of which the following is a specification.

My invention contemplates an improved device for gripping and picking up various articles—such, for example, as cooking utensils, household articles, and various other things.

With the construction employed the device will grip and pick up a great many different articles of different shapes and sizes and is of quite general utility. It avoids the necessity of gripping and picking up many things by hand—that is, of bringing the hand into direct contact with such things.

In the accompanying drawings, Figure 1 is a perspective of a gripping and lifting device embodying the principles of my invention. Fig. 2 is a plan of the same. Fig. 3 is a side elevation of the said device. Fig. 4 is an end view of the same. Fig. 5 is a cross-section on line 5 5 in Fig. 3.

As thus illustrated, my improved lifting and gripping device comprises a handle A, consisting of a length of wire bent into shape to provide two parallel portions $a$, connected at their outer ends by a transverse portion $a'$. The end portions of the said length of wire are bent down and around to provide a pair of hooks $a^2$. The sliding jaw B comprises, preferably, a shorter length of wire bent into shape to provide two parallel portions $b$, connected at one end by a transverse portion $b'$. The other ends of this second and shorter length of wire are bent down and forward for the purpose of providing a pair of hook-shaped portions $b^2$. A wooden handle $b^3$ is secured to the said sliding jaw, and to opposite ends of this handle metal plates $b^4$ are secured and adapted to slide on the parallel portions $a$ of the handle A. For such purpose the said metal plates are provided with openings for the parallel portions $b$ and also for the parallel portions $a$, as shown more clearly in Figs. 1 and 4. With this construction the hook-shaped portions $b^2$ can be pushed toward and away from the hook-shaped portions $a^2$, according to the size of the article to be gripped and lifted. The handle A can be held in one hand, and the handle B perhaps operated by the same hand; but if this is not convenient the handle A can be held in one hand while the handle B is manipulated by the other hand. With the range of adjustment provided the hooks or claws of the gripper can be caused to grip and lift various articles of various shapes and sizes, thus obviating the necessity of bringing the hand in direct contact with such articles.

With the construction shown the gripping device can be cheaply manufactured, as it is composed mostly of rods or heavy wire; but at the same time it is strong and rigid and convenient to handle. The hook-shaped portions are so shaped and arranged relatively to each other that they will pick up cooking utensils of various shapes and sizes, as well as other household articles. My improved gripping and lifting device is, however, designed and adapted for general utility.

What I claim as my invention is—

1. In a plate-lifter, the combination with a rod or wire bent upon itself to form two straight parallel portions of equal length, the end of each portion bent outwardly, downwardly and rearwardly to form fixed gripping-hooks, of a movable element comprising spaced supports rigidly connected together and mounted to slide on the straight parallel portions of said rod, said rigid connection between the supports being formed of a shorter length of rod or wire bent upon itself to form two straight parallel portions of equal length, the end of each portion being bent outwardly, downwardly, and forwardly, to form hooks oppositely disposed to and adapted to coact with said fixed hooks, the straight parallel portions of said shorter wire being rigidly connected to said sliding supports to connect and space the same.

2. In a plate-lifter a long and a short rod or wire each bent upon itself near its center to form two straight parallel portions having gripping-hooks at their ends, supports mounted to slide on the parallel portions of the longer rod, said supports being rigidly connected to and spaced by the parallel portions of the shorter rod, the gripping-hooks on the longer and shorter rods respectively, being oppositely disposed and adapted to coact to grip different sides of plates when moved toward and from each other.

Signed by me at Chicago, Illinois, this 22d day of July, 1905.

FRANK C. WILLIAMS.

Witnesses:
 EDW. J. BEST,
 ALBERT J. SAUSER.